July 26, 1966     P. F. STURMAN     3,262,383
CONVEYOR TYPE TOASTER
Filed April 29, 1964
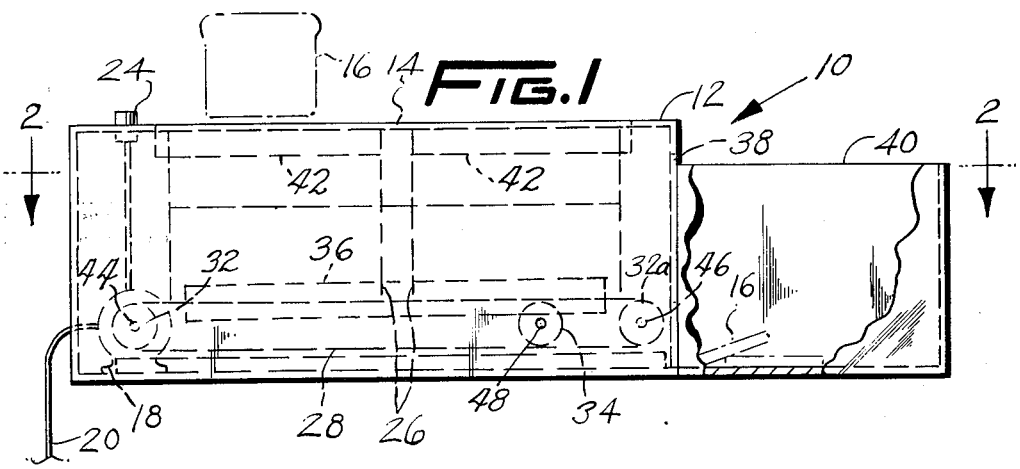
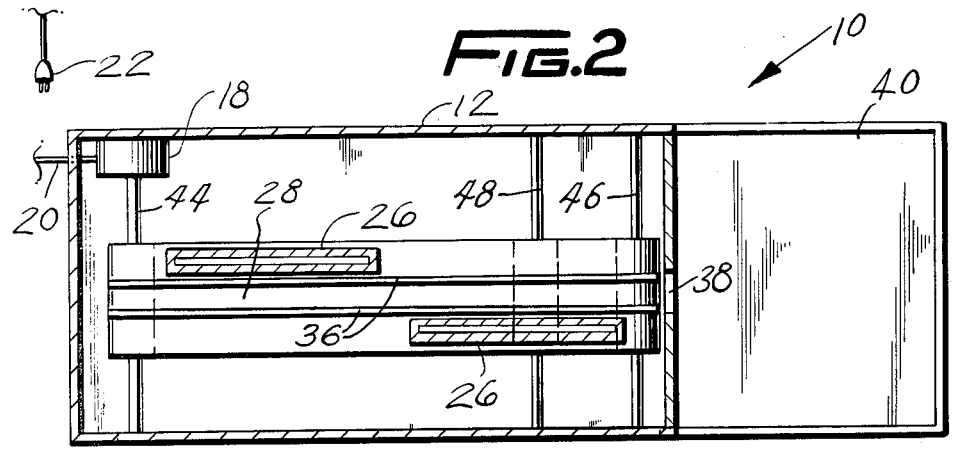
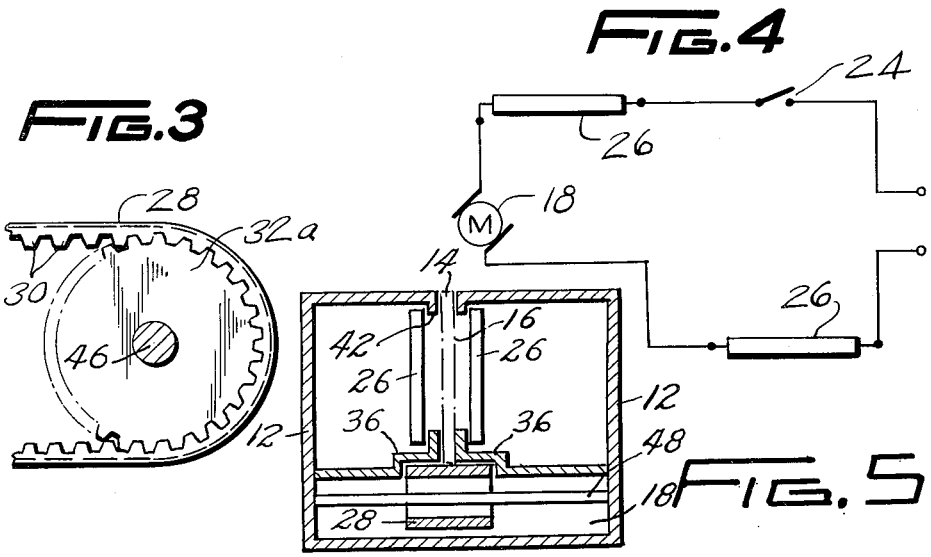

United States Patent Office 3,262,383
Patented July 26, 1966

1

3,262,383
CONVEYOR TYPE TOASTER
Philip F. Sturman, 548 W. Belmont St., Chicago 13, Ill.
Filed Apr. 29, 1964, Ser. No. 363,411
1 Claim. (Cl. 99—386)

This invention relates to electric toasting devices and more particularly to an automatic conveyor type toaster.

It is an object of the present invention to provide a conveyor type toaster which will be used in restaurants, homes and the like.

Another object of the present invention is to provide a conveyor type toaster which will have an internal conveyor belt for moving the bread past heating elements and toasting the bread evenly.

A further object of the present invention is to provide a conveyor type toaster which will have tray means for catching completely toasted bread and allowing the bread to be easily picked up.

Other objects of the invention are to provide a conveyor type toaster bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention shown in elevation;

FIGURE 2 is a cross sectional view taken along the lines 2—2 of FIGURE 1 showing the heating elements in sectional lines;

FIGURE 3 is an enlarged fragmentary side view showing one of the drive gears of the invention;

FIGURE 4 is a schematic wiring diagram of the invention; and

FIGURE 5 is a fragmentary cross sectional view showing the belt heat guards, heating elements and continuous belt and their relationship to each other.

Referring now more in detail to the drawing, a conveyor type toaster 10 made in accordance with the present invention is shown to include a hollow rectangular housing 12 made of metal or other suitable material having a slot 14 providing a means for entering bread 16, the slot being provided with parallel inwardly turned lip portions 42 which serve as guides for bread slices. A motor 18 secured within toaster 10 is provided with a cord 20 and a plug 22, and a switch 24 is wired in series with a pair of spaced apart and staggered heating elements 26 and the motor 18, providing circuit means for toaster 10. A continuous heat resistant belt 28 having a plurality of teeth 30 is driven by drive gears 32 and 32a mounted on motor shaft 44 and 46 respectively and carries the bread 16 past the heating elements 26. An idler roller 34 mounted on a shaft 48 and received between continuous belt 28 is in rolling engagement with belt 28 and prevents sagging of belt 28 when the device is in operation. A pair of parallel, spaced apart belt guards 36 of Z-shaped configuration provide means for preventing damage to belt 28 from the heat of elements 26 and belt 28 is freely received between belt guards 36. A vertical slot 38 through an end wall of housing 12 provides a means for exiting toasted bread 16 in a hollow tray 40 of rectangular configuration which allows the toasted bread to be picked up easily.

In operation, bread 16 is placed into slot 14 of housing 12 and switch 24 turned to the on position which will

2 cause the first heating element 26 to toast the bread on one side, while belt 28 driven by motor 18 propels the bread 16 forward, whereupon the next heating element 26 toasts the other side of the bread 16, and when bread 16 reaches the end of belt 28, it is exited through slot 38, whereupon it falls into tray 40.

It shall be recognized that the belt guards 36 serve also to hold the bread 16 vertical as it is being propelled forward by belt 28, and the guards 36 are also in alignment with the entrance slot 14 of housing 12.

It shall further be noted that motor 18 is provided with a reduction gear box (not shown) to allow belt 28 to be driven sufficiently slowly for the heating elements 26 to properly toast bread 16.

While various changes may be made in the detail construction, it shall be understood that such changes shall be within the spirit and scope of the present invention as defined by the appended claim.

What I claim as new and desire to protect by Letters Patent of the United States is:

A conveyor type toaster comprising in combination a hollow rectangular housing having two side walls, two end walls, a top wall and a bottom wall, a motor mounted within said housing adjacent one of said side walls and one of said end walls, a sprocket gear mounted near each end wall at the center thereof, a drive shaft connecting said motor to one of said sprocket gears, an endless conveyor belt mounted on said sprocket gears, said belt and gears having cooperating inter-engaging means thereon, an idler roller mounted adjacent said other sprocket gear to provide support for the upper run of said conveyor belt, the top wall having an opening therein to receive vertically positioned slices of bread, there being parallel inturned lip portions along each side of said opening to serve as a guide for bread slices, two staggered, parallel heating elements located above and adjacent opposite sides of the upper run of the conveyor belt, a Z-shaped guard element extending along each side of the upper run of the conveyor belt so as to protect the belt from the heat generated by said heating elements, one leg of each Z-shaped element extending upwardly toward said inturned lip portions in the same plane thereof to also serve as a guide for a slice of bread, said other end wall having an opening therein through which a slice of bread may pass out of said housing, a tray integrally connected to said housing, to receive a toasted slice of bread as it emerges through said end wall opening and a switch for said motor, the heating elements, the motor, and the switch being in series circuit to provide simultaneous operation of the conveyor belt and the heating elements.

References Cited by the Examiner
UNITED STATES PATENTS

| 1,443,242 | 1/1923 | Roth _____ 99—386 |
| 1,708,522 | 4/1929 | Pross _____ 99—386 X |
| 1,807,312 | 5/1931 | Henley. |
| 1,849,205 | 3/1932 | Rypinski _____ 198—202 X |
| 2,151,401 | 3/1939 | Belcher. |
| 2,238,309 | 4/1941 | Cramer _____ 99—386 |
| 2,456,291 | 12/1948 | Malone _____ 99—386 X |
| 3,087,418 | 4/1963 | Albright _____ 99—386 X |

FOREIGN PATENTS 579,200    7/1946    Great Britain.

WILLIAM I. PRICE, Primary Examiner.
BILLY J. WILHITE, WALTER A. SCHEEL, Examiners.